United States Patent [19]

Shonaka

[11] Patent Number: 4,672,573
[45] Date of Patent: Jun. 9, 1987

[54] PROGRAMMABLE CONTROLLER WITH IMPROVED RETURN PROCESSING CAPABILITIES AFTER A POWER INTERRUPTION

[75] Inventor: Hisashi Shonaka, Kyoto, Japan
[73] Assignee: Omron Tateisi Electronics Co., Kyoto, Japan
[21] Appl. No.: 571,750
[22] Filed: Jan. 18, 1984

[30] Foreign Application Priority Data

Jan. 20, 1983 [JP] Japan .................................. 58-8109

[51] Int. Cl.4 .............................................. G06F 13/00
[52] U.S. Cl. .................................................. 364/900
[58] Field of Search ............... 364/200, 900, 483, 707, 364/710; 358/190; 340/660–663, 693

[56] References Cited

U.S. PATENT DOCUMENTS

| | | | |
|---|---|---|---|
| 4,196,476 | 4/1980 | Steiner | 364/900 |
| 4,313,160 | 1/1982 | Kaufman et al. | 364/200 |
| 4,453,215 | 6/1984 | Reid | 364/200 |
| 4,458,307 | 7/1984 | McAnlis et al. | 364/200 |
| 4,486,826 | 12/1984 | Wolff et al. | 364/200 |

*Primary Examiner*—David Y. Eng
*Attorney, Agent, or Firm*—Stevens, Davis, Miller & Mosher

[57] ABSTRACT

A programmable controller is provided for controlling, e.g., external devices according to a given control cycle. A non-volatile user program memory stores a user program including a power-off processing program. A non-volatile input/output memory stores (1) external input data corresponding to an input circuit which receives external input signals and an output circuit and (2) internal input/output data for internal operation. A non-volatile flag memory stores flags for instructing processing contents at restoration of power-off. A flag setting unit is provided for setting the flag to the flag memory at a stage as determined by the user program. When power restoration occurs, first a determination is made as to whether a state maintain flag as been set. If the state maintain flag has been set, an output inhibit circuit is actuated. Thus, while data in the input/output memory is maintained without modification, the output inhibit circuit causes data not to be delivered to the output circuit. After execution of this routine, control is then performed in accordance with the data which existed immediately prior to occurrence of power-off. However, if the state maintain flag has not been set, the input/output memory is cleared, and after execution of this routine, control is then performed based on the initial data of the processing operation.

7 Claims, 2 Drawing Figures

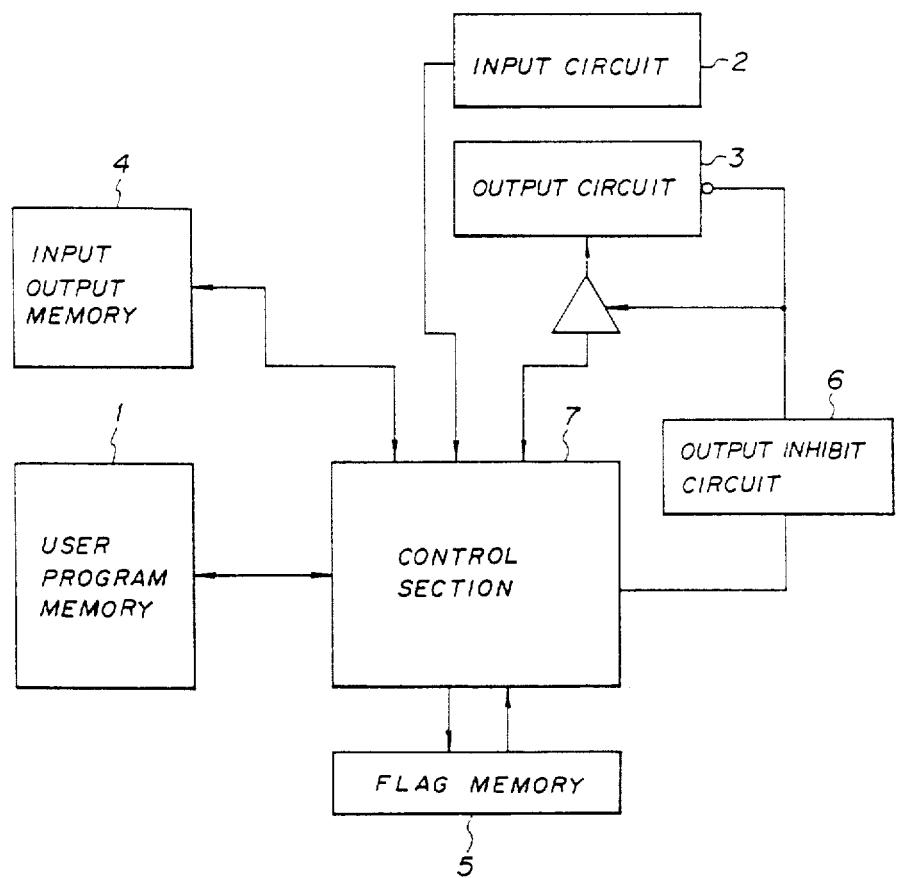

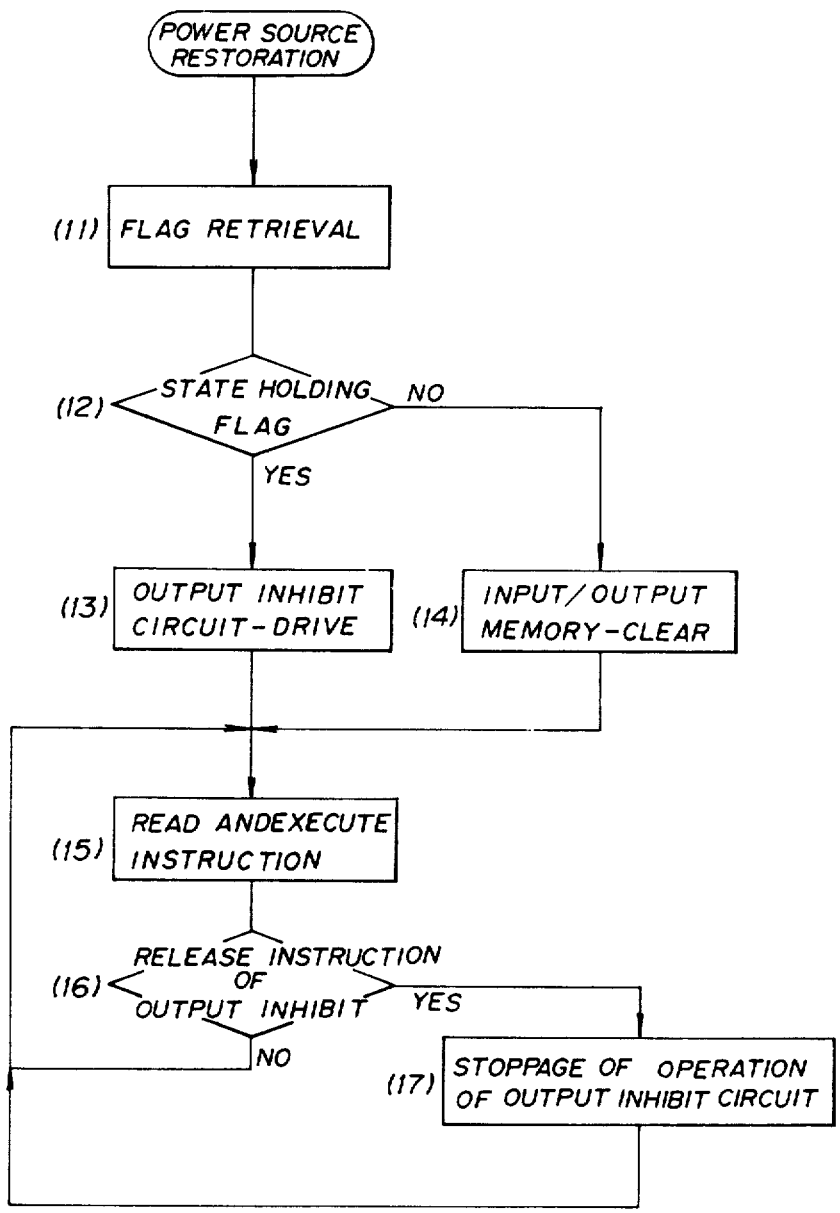

PROGRAMMABLE CONTROLLER WITH IMPROVED RETURN PROCESSING CAPABILITIES AFTER A POWER INTERRUPTION

BACKGROUND OF THE INVENTION

The invention relates to a programmable controller for controlling input/output devices in a desired order, and more particularly, to a return processing device for use upon restoration of power source after service interruption.

Generally, programmable controllers basically comprise a user program memory for storing a user program, an input circuit to which external input signal is applied, an output circuit for delivering an external output signal, an input/output memory for storing external input/output data corresponding to said input circuit and said output circuit and internal input/output data for internal operations, and a control section for executing instructions provided by the user program memory to perform predetermined control operations. The basic control operations performed by the control section include operational processing performed on the basis of data in the input/output memory, rewriting output data in the input/output memory in accordance with results from the operational processing step writing input data of the input circuit into a predetermined area of the input/output memory, setting and output data in the predetermined area of the input/output memory to the output circuit.

In factories where programmable controller of this kind are installed, service interruption occurs, and temporary lowering of power source voltage (simultaneous service interruption) resulting from operation of many electric devices often occurs. Then, it is necessary for the programmable controller to ensure safe operation of the electric devices even if such service interruption should occur. That is, the problem is the return processing upon restoration of power source after service interruption. This return processing mainly comprises the processing of a judgment of whether or not the content of the output circuit is returned to the state prior to occurrence of power-off or whether or not the circuit is initialized to restart the operation from the beginning. This judgement is made in accordance with the input/output state existing at the occurrence of power-off, the input state existing at restoration of power source, etc.

However, a conventional programmable controller has been designed so that only the area for storing the internal input/output data out of the input/output memories is provided to maintain the stored data at the time of power-off. Here, the external input/output data is not maintained at the time of power-off in order to prevent unexpected status from being brought forth due to the delivery of the content of the input/output memory to the external devices from the output circuit at the restoration of power source.

Therefore, the power-off processing program prepared by the user was necessary to include processing for transferring the external input/output data, which are present until the power-off occurs, from the predetermined area of the input/output memory to a memory such as a keep relay having a memory maintaining function, and also to include processing for retransferring the external input/output data maintained by the aforementioned memory, such as a keep relay, upon restoration of power from the power source to the input/output memory. A power-off processing program including such processings as described above is extremely difficult to understand, is complicated and is not favorably accepted.

SUMMARY OF THE INVENTION

It is an object of the present invention to provide a programmable controller which can be prepared easily by the user without making the power-off processing program complicated.

It is a further object of the present invention to provide a programmable controller which can perform adequate return processing at the restoration after the power has been turned off.

According to the present invention, a programmable controller is provided which includes a flag memory for storing flags which indicate the processing contents at the restoration of power-off, a user program memory and an input/output memory having a memory maintaining function at the time of power-off and an output inhibit circuit to inhibit the delivery of the external output signal by the output circuit, whereby return processing after power-off can be adequately performed by a relatively simple power-off processing program.

BRIEF DESCRIPTION OF THE DRAWINGS

FIG. 1 is a block diagram showing a programmable controller in accordance with one embodiment of the present invention.

FIG. 2 is a flow chart mainly showing a part related to the present invention out of the control operations of the apparatus in the embodiment illustrated in FIG. 1.

DETAILED DESCRIPTION OF THE INVENTION

FIG. 1 shows a programmable controller in accordance with one embodiment of the present invention.

This programmable controller basically comprises a user program memory 1 in which is stored a user program including a power-off processing program, an input circuit 2 to which is applied an external input signal, an output circuit 3 which delivers an external output signal, an input/output memory 4 in which is stored external input/output data corresponding to input circuit 2 and output circuit 3 and internal input/output data for internal operation, a flag memory 5 in which in stored flags which indicate processing which exit at restoration of power-off, an output inhibit circuit 6 for inhibiting the delivery of the external output signal by output circuit 3, and a control section 7 for executing instructions of the aforementioned user program.

User program memory 1, input/output memory 4, flag memory 5 each comprise a RAM. Back up processing at the time of power-off is performed by a dry cell, a charging capacitor, or a secondary cell, etc. That is, these memories are non-volatile.

The power-off processing program included in the user program mainly consists of instructions for instructing clearing of contents of the input/output memory 4 at the restoration of power-off, instructions for instructing maintaining of contents, without modification, of the input/output memory 4 at the restoration of power-off, instructions for instructing the inhibit operation of the output inhibit circuit 6, and instructions for instructing stopping of the inhibit operation of the output inhibit circuit 6.

Flags stored in the flag memory 5 are set by flag setting means 8 and include a clear flag for clearing the input/output memory 4 and a state maintaining flag for instructing the maintainance of contents in the input/output memory 4 without modification.

Control section 7 comprises a central processing unit (CPU), a ROM in which is stored a system program, and a RAM which is used by CPU as working memory.

The basic control operations of the CPU will be briefly described as follows: The control operations include the operation for operational processing on the basis of the data contained in the input/output memory 4, the operation for rewriting output data in the input/output memory 4 in accordance with the results of the operational processing, the operation for input updating in which input data of the input circuit 2 is written in a predetermined area of the input/output memory 4, and the operation for output updating in which output data in the predetermined area of the input/output memory 4 is set to the output circuit 3. The above-described basic control operations are well known and therefore will not be further described.

In the present invention, the CPU performs the restoration processing operation on the basic of the power-off processing program in addition to the above-described basic operations.

FIG. 2 is a flow chart mainly showing the processing operation after restoration of power-off out of the control operations performed by the CPU. This will be described with reference to the drawing.

First, when power-off occurs, either the clear flag or the state maintaining flag is set to the flag memory 5 accordingly. The flag to be set is determined depending upon where the power-off occurs in the control cycle.

When the power source is restored, routines after step 11 are executed.

In the first step 11, the flag memory 5 is referred to in order to detect the contents of the flag.

In step 12, the step is branched into step 13 and step 14 according to the contents of the detected flag.

In step 13, the output inhibit circuit 6 is actuated. As a consequence, data in the input/output memory 4 is maintained without modification, but data is not delivered to the output circuit 3. Thus, confusion will not occur due to the delivery of useless signals to the external devices. After passage of this routine, controlling is performed next to the state prior to occurrence of power-off.

In step 14, the input/output memory 4 is cleared after passage of this routine, and controlling is restarted from the initial state.

In step 15, the user instructions are read from the user program memory 1 for execution.

In step 16, the step is branched into step 15 and step 17 according to the read instructions.

In step 17, the inhibit operation of the output inhibit circuit 6 is stopped. As a consequence, predetermined output data are set to the output circuit 3.

As described above, after the restoration of power source, adequate processing is performed, that is, the control operation is restarted from the initial state or is continuously performed from the state prior to occurrence of power-off.

What is claimed is:

1. A programmable controller for controlling external devices according to a given control cycle, comprising:

a non-volatile user program memory for storing a user program including a power-off processing program;

an input circuit for receiving an external input signal;

an output circuit for delivering an external output signal;

a non-volatile input/output memory for storing (i) external input data corresponding to said input circuit and said output circuit and (ii) internal input/output data for internal operation;

a non-volatile flag memory for storing a flag for instructing processing contents at restoration of power-off;

an output inhibit circuit for inhibiting delivery of said external output signal by said output circuit to said external devices, and a control section for executing instructions provided by said user program, said control section comprising:

flag setting means, responsive to said user program, for setting said flag to said flag memory, said output inhibit circuit comprising means for inhibiting delivery of said external output signal by said output circuit upon restoration of power source in response to a setting of said flag, judgment means for judging, at restoration of power source, whether said flag has been stored in said flag memory, restoration processing means, responsive to a judgment by said judgment means with respect to whether said flag has been stored in said flag memory at restoration of power source, for performing restoration processing by one of (i) starting a control operation from an initial data state and (ii) continuing a control operation at a previous data state which existed immediately prior to said occurrence of power-off in accordance with whether said flag has been stored in said flag memory at restoration of power source, and output inhibit operation releasing means, responsive to a completion by said restoration processing means of performing restoration processing by said continuing of a control operation at said previous data state, for stopping operation of said output inhibit circuit.

2. The programmable controller according to claim 1 wherein said judgment means comprises flag retrieval means for referring to said flag memory, and flag determination means for determining if a flag has been stored in said flag memory.

3. The programmable controller according to claim 1, further comprising means, responsive to a judgment by said judgment means, for clearing said input/output memory if said flag has not been stored in said flag memory and for providing an instruction to prevent clearing of said input/output memory if said flag has been stored in said flag memory.

4. A programmable controller for controlling external devices according to a given control cycle, comprising:

a non-volatile user program memory for storing a user program, including a power-off processing program;

an input circuit for receiving an external input signal;

an output circuit for delivering an external output signal;

a non-volatile input/output memory for storing (i) external input data corresponding to said input circuit and said output circuit and (ii) internal input/output data for internal operation;

a non-volatile flag memory for storing at least two different types of flags for instructing processing contents at restoration of power-off;

an output inhibit circuit for inhibiting delivery of said external output signal by said output circuit to said external devices, and a control section for executing instructions provided by said user program, said control section comprising:

flag setting means, responsive to said user program, for setting a said flag to said flag memory, said output inhibit circuit comprising means for inhibiting delivery of said external output signal by said output circuit upon restoration of power source in response to a setting of a predetermined one of said types of flags, judgment means for judging, at restoration of power source, which of said flags has been stored in said flag memory, restoration processing means, responsive to a judgment by said judgment means with respective to which of said flags has been stored in said flag memory at restoration of power source, for performing restoration processing by one of (i) starting a control operation from an initial data state and (ii) continuing a control operation at a previous data state which existed immediately prior to said occurrence of power-off, in accordance with which of said flags has been stored in said flag memory at restoration of power source, and output inhibit operation releasing means, responsive to a completion by said restoration processing means of performing restoration processing by said continuing of a control operation at said previous data state, for stopping operation of said output inhibit circuit.

5. The programmable controller according to claim 4 wherein said flag comprise a clear flag for providing an instruction to clear said input/output memory, and a state maintaining flag for providing an instruction not to clear said input/output memory.

6. The programmable controller according to claim 4 wherein said flag setting means comprises means for setting either a clear flag or said state maintaining flag to flag memory.

7. The programmable controller according to claim 6, wherein said judgment means comprises flag retrieval means for referring to said flag memory and flag determination means for determining if a flag stored in said flag memory is a cler flag or a state maintaining flag.

* * * * *